(12) United States Patent
Yang et al.

(10) Patent No.: US 10,824,333 B2
(45) Date of Patent: Nov. 3, 2020

(54) KEYBOARD DISPLAY METHOD AND DEVICE, TERMINAL AND STORAGE MEDIUM BASED ON A SPLIT-SCREEN WINDOW STATE

(71) Applicant: BEIJING XIAOMI MOBILE SOFTWARE CO., LTD., Beijing (CN)

(72) Inventors: Lilian Yang, Beijing (CN); Wei Yu, Beijing (CN); Zile Zou, Beijing (CN); Ting Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/120,204

(22) Filed: Aug. 31, 2018

(65) Prior Publication Data

US 2019/0073123 A1   Mar. 7, 2019

(30) Foreign Application Priority Data

Sep. 6, 2017   (CN) .......................... 2017 1 0797104

(51) Int. Cl.
*G06F 3/0488* (2013.01)
(52) U.S. Cl.
CPC ........ *G06F 3/04886* (2013.01); *G06F 3/0488* (2013.01); *G06F 2203/04803* (2013.01)
(58) Field of Classification Search
CPC ....... G06F 3/04886; G06F 2203/04803; G06F 3/0481; G06F 3/0488
See application file for complete search history.

(56) References Cited

U.S. PATENT DOCUMENTS

| | | | |
|---|---|---|---|
| 5,148,155 A * | 9/1992 | Martin | G06F 3/038 178/18.03 |
| 2011/0285631 A1 | 11/2011 | Imamura | |
| 2013/0135350 A1* | 5/2013 | Santos-Gomez | G06F 3/04886 345/649 |
| 2014/0085188 A1* | 3/2014 | Kim | H04M 1/72522 345/156 |
| 2014/0189566 A1* | 7/2014 | Kim | G06F 3/013 715/773 |
| 2015/0095833 A1* | 4/2015 | Kim | G06F 3/04886 715/773 |

(Continued)

FOREIGN PATENT DOCUMENTS

| | | |
|---|---|---|
| CN | 102439556 A | 5/2012 |
| CN | 103309616 A | 9/2013 |

(Continued)

OTHER PUBLICATIONS

"How to make it obvious that you can drag things you normally can't?", Feb. 5, 2013. "Stack Exchange" (https://ux.stackexchange.com/questions/34158/how-to-make-it-obvious-that-you-can-drag-things-that-you-normally-cant) (Year: 2013).*

(Continued)

*Primary Examiner* — Daniel Samwel
(74) *Attorney, Agent, or Firm* — Syncoda LLC; Feng Ma

(57) ABSTRACT

A method of displaying a keyboard includes: determining a window state of a current window when an input operation is detected based on the current window; and displaying a floating keyboard at an upper layer of a screen in a floating manner based upon the determined window state being a split-screen state.

16 Claims, 8 Drawing Sheets determining a window state of a current window when an input operation is detected based on the current window  101 displaying a floating keyboard which is displayed on an upper layer of a screen in a floating manner when the window state is a split-screen state  102

(56) References Cited

U.S. PATENT DOCUMENTS

| | | | | |
|---|---|---|---|---|
| 2015/0160842 A1* | 6/2015 | Yabuki | ................ | G06F 3/04845 |
| | | | | 715/773 |
| 2015/0378550 A1* | 12/2015 | Miyazaki | .............. | G06F 3/0482 |
| | | | | 715/784 |
| 2016/0026358 A1* | 1/2016 | Stewart | ..................... | G06F 3/14 |
| | | | | 715/781 |
| 2016/0034153 A1* | 2/2016 | Lejeune | .............. | G06F 3/04847 |
| | | | | 715/765 |
| 2016/0370864 A1* | 12/2016 | Choi | .................... | G06F 3/0488 |
| 2017/0300227 A1* | 10/2017 | Wang | ................... | G06F 3/0484 |

FOREIGN PATENT DOCUMENTS

| | | |
|---|---|---|
| CN | 103902137 A | 7/2014 |
| CN | 104699404 A | 6/2015 |
| CN | 105183420 A | 12/2015 |
| CN | 106708411 A | 5/2017 |
| EP | 2712157 A1 | 3/2014 |
| EP | 3086223 A1 | 10/2016 |

OTHER PUBLICATIONS

Extended European Search Report in EP18192962.1 dated Feb. 21, 2019.
First office action of Chinese application No. 201710797104.3 dated Jan. 6, 2020.

\* cited by examiner

KEYBOARD DISPLAY METHOD AND DEVICE, TERMINAL AND STORAGE MEDIUM BASED ON A SPLIT-SCREEN WINDOW STATE

CROSS-REFERENCE TO RELATED APPLICATION

The present application claims the priority to Chinese Patent Application No. 201710797104.3, filed on Sep. 6, 2017, the disclosure of which is hereby incorporated by reference in its entirety.

BACKGROUND

With the development of technologies or various types of terminals and touch screens, modern terminals such as cellular phones generally have touch screens. When a terminal detects an input operation, a virtual keyboard can be displayed on the screen to for a user to type quick input using the virtual keyboard. Modern terminals also can provide a split-screen display mode. In the split-screen display mode, the terminal can divide the screen into multiple split-screen windows, and different split-screen windows can display the content of different applications.

SUMMARY

The present disclosure relates to the field of terminal technology, and in particular to a keyboard display method and device, a terminal and a storage medium.

In a first aspect of the present disclosure, a method of displaying a keyboard is provided, including: determining a window state of a current window when an input operation is detected based on the current window; and displaying a floating keyboard at an upper layer of a screen in a floating manner based upon the determined window state being a split-screen state.

In some embodiments, the determining the window state of the current window includes: acquiring the window state of the current window through a system interface; wherein the displaying the floating keyboard includes: calling via a system a specified input-method application and sending a specified flag to the specified input-method application based upon the window state acquired through the system interface being the split-screen state, wherein the specified input-method application comprises an input-method application preset to execute the input operation, and the specified flag indicates that the window state of the current window is the split-screen state; and starting up the floating keyboard through the specified input-method application based on the specified flag and displaying the floating keyboard.

In some embodiments, the starting up the floating keyboard through the specified input-method application based on the specified flag and displaying the floating keyboard includes: in a case that the specified flag further indicates a display position of the current window, starting up the floating keyboard through the specified input-method application, and displaying the floating keyboard in a position corresponding to the display position of the current window.

In some embodiments, the floating keyboard further comprises a keyboard mode switching key, and the method further includes: switching the floating keyboard into a common keyboard that takes up a bottom area of the screen when a switching command triggered by the keyboard mode switching key is received based on the floating keyboard.

In some embodiments, the method further includes, after the displaying the floating keyboard based upon the window state being the split-screen state: monitoring whether or not to exit the split-screen state; and switching the floating keyboard into a common keyboard that takes up a bottom area of the screen if exiting the split-screen state is monitored.

In some embodiments, the method further includes, after the displaying the floating keyboard, at least one of: adjusting a display position of the floating keyboard based on a position adjustment command when the position adjustment command is received based on the floating keyboard; or adjusting a display size of the floating keyboard based on a size adjustment command when the size adjustment command is received based on the floating keyboard.

In some embodiments, the method further includes: displaying a common keyboard in a case that the window state is not the split-screen state, wherein the common keyboard takes up a bottom area of the screen and comprises a keyboard mode switching key; and switching the common keyboard into the floating keyboard when a switching command triggered by the keyboard mode switching key is received based on the common keyboard.

In another aspect, a terminal is provided, including: a processor; and memory configured to store instructions executable by the processor; wherein the processor is configured to: determine a window state of a current window when an input operation is detected based on the current window; and display a floating keyboard at an upper layer of a screen in a floating manner when the window state is the split-screen state.

In some embodiments, the processor is further configured to: acquire the window state of the current window through a system interface; call via a system a specified input-method application and send a specified flag to the specified input-method application in a case that the window state acquired through the system interface is the split-screen state, wherein the specified input-method application comprises an input-method application preset to execute the input operation, and the specified flag indicates that the window state of the current window is the split-screen state; and start up the floating keyboard through the specified input-method application based on the specified flag and displaying the floating keyboard.

In some embodiments, the processor is further configured to: start up, when the specified flag further indicates a display position of the current window, the floating keyboard through the specified input-method application; and display the floating keyboard in a position corresponding to the display position of the current window.

In some embodiments, the floating keyboard further includes a keyboard mode switching key, the processor is further configured to: switch the floating keyboard into a common keyboard that takes up a bottom area of the screen when a switching command triggered by the keyboard mode switching key is received based on the floating keyboard.

In some embodiments, the processor is further configured to: monitor whether or not to exit the split-screen state; and switch the floating keyboard into a common keyboard that takes up a bottom area of the screen if exiting the split-screen state is monitored.

In some embodiments, the processor is further configured to: adjust a display position of the floating keyboard based on a position adjustment command when the position adjustment command is received based on the floating keyboard; and/or adjust a display size of the floating keyboard based on a size adjustment command when the size adjustment command is received based on the floating keyboard.

In some embodiments, the processor is further configured to: display a common keyboard in a case that the window state is not the split-screen state, wherein the common keyboard takes up a bottom area of the screen and comprises a keyboard mode switching key; and switch the common keyboard into the floating keyboard when a switching command triggered by the keyboard mode switching key is received based on the common keyboard.

In another aspect, a non-transitory computer-readable storage medium is provided having stored therein instructions executable by a processing circuit, the instructions including: determining a window state of a current window when an input operation is detected based on the current window; and displaying a floating keyboard at an upper layer of a screen in a floating manner based upon the determined window state being a split-screen state.

In some embodiments, the determining the window state of the current window includes: acquiring the window state of the current window through a system interface; wherein the displaying the floating keyboard includes: calling via a system a specified input-method application and sending a specified flag to the specified input-method application based upon the window state acquired through the system interface being the split-screen state, wherein the specified input-method application comprises an input-method application preset to execute the input operation, and the specified flag indicates that the window state of the current window is the split-screen state; and starting up the floating keyboard through the specified input-method application based on the specified flag and displaying the floating keyboard.

In some embodiments, the starting up the floating keyboard through the specified input-method application based on the specified flag and displaying the floating keyboard includes: in a case that the specified flag further indicates a display position of the current window, starting up the floating keyboard through the specified input-method application, and displaying the floating keyboard in a position corresponding to the display position of the current window.

In some embodiments, the floating keyboard further includes a keyboard mode switching key, and the instructions further include: switching the floating keyboard into a common keyboard that takes up a bottom area of the screen when a switching command triggered by the keyboard mode switching key is received based on the floating keyboard.

In some embodiments, the instructions further include, after the displaying the floating keyboard based upon the window state being the split-screen state: monitoring whether or not to exit the split-screen state; and switching the floating keyboard into a common keyboard that takes up a bottom area of the screen if exiting the split-screen state is monitored.

In some embodiments, the instructions further include, after the displaying the floating keyboard, at least one of: adjusting a display position of the floating keyboard based on a position adjustment command when the position adjustment command is received based on the floating keyboard; or adjusting a display size of the floating keyboard based on a size adjustment command when the size adjustment command is received based on the floating keyboard.

It is to be understood that both the foregoing general description and the following detailed description are exemplary and explanatory only and are not restrictive of the present disclosure.

BRIEF DESCRIPTION OF THE DRAWINGS

The accompanying drawings referred to in the specification are a part of this specification, and provide illustrative embodiments consistent with the disclosure and, together with the detailed description, serve to illustrate some embodiments of the disclosure.

DETAILED DESCRIPTION

Figure 1:
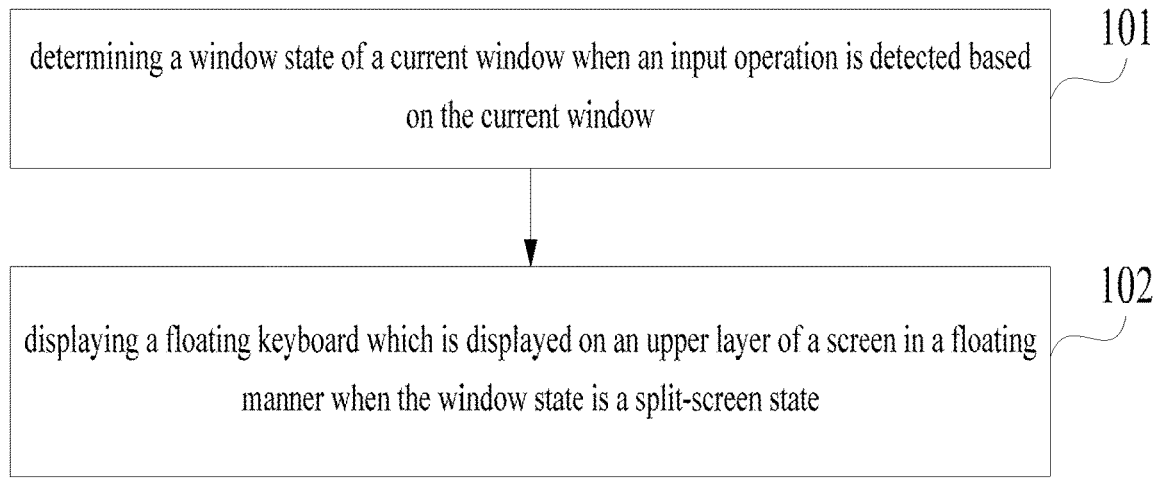
FIG. 1 is a flowchart illustrating a keyboard display method according to some embodiments.

Various embodiments of the present disclosure are described below with specific examples, and other advantages and effects of the present disclosure can be easily understood by those skilled in the field of technology from the contents disclosed in this specification. The following description refers to the accompanying drawings in which same numeral references in different drawings may represent the same or similar elements unless otherwise indicated. Apparently, the described embodiments are only a part of embodiments in the present disclosure, rather than all of them. The present disclosure can also be implemented or applied through different specific embodiments, and various details of the specification can also be modified or changed based on different viewpoints and applications without departing from the spirit of the present disclosure.

Before detailed explanation of various embodiments of the present disclosure, some application scenarios of various embodiments of the present disclosure are explained at first.

At present, many terminals have a split-screen display mode, and the terminals generally can only call common keyboards when an input operation is received, whether in the split-screen display mode or a normal display mode.

For example, in the split-screen display mode, the terminal generally can only call and display only the common keyboard when an input operation is received in any split-screen window. The common keyboard refers to the keyboard which pops up from the bottom of the screen and can only take up the bottom area of the screen. Under normal conditions, the width of the common keyboard is equal to that of the screen, and the height of the common keyboard is about half of that of the screen.

However, in the split-screen display mode, the size of each split-screen window displayed by the terminal is relatively small. Therefore, when the common keyboard is called in the split-screen display mode, the input box of the split-screen window may be covered, and consequently normal input may not be performed.

For example, when the terminal displays two split-screen windows, i.e., an upper one and a lower one, if an input operation is detected in the input box of the lower split-screen window and the input box is at the middle upper part of the lower split-screen window, the terminal can enable the common keyboard to pop up from the bottom of the screen. The common keyboard may cover the input box of the lower split-screen window, and a user cannot perform normal input.

Alternatively, when the terminal displays two split-screen windows, i.e., an upper one and a lower one, if an input operation is detected in the input box of the upper split-screen window and the input box is at the middle lower part of the upper split-screen window, the terminal can enable the common keyboard to pop up from the bottom of the screen, and the content originally displayed on the screen moves upwards accordingly. That is, the content originally at the bottom of the screen moves upwards to the top of the common keyboard. With the upward movement of the originally displayed content, the upper split-screen window may disappear, and consequently, normal input may not be performed.

FIG. 1 is a flowchart of a keyboard display method according to some embodiments of the present some embodiments disclosure. The method may be applied to a terminal. As shown in FIG. 1, the method includes the following steps.

In step 101, a window state of a current window is determined if an input operation is detected based on the current window.

In step 102, a floating keyboard is displayed if the window state is a split-screen state. The floating keyboard is displayed on an upper layer of a screen in a floating manner.

In some embodiments of the present disclosure, when an input operation is detected based on the current window, the window state of the current window may be determined at first. When the window state of the current window is the split-screen state, the floating keyboard is displayed. As the floating keyboard may be displayed on the upper layer of the screen in a floating manner, the input box of the split-screen window can be prevented from being covered. Therefore, the keyboard display flexibility is improved, and the normal input of the user is guaranteed.

In some embodiments, determining the window state of the current window includes: acquiring the window state of the current window through a system interface.

Correspondingly, displaying the floating keyboard when the window state is the split-screen state includes: calling via a system a specified input-method application and sending a specified flag to the specified input-method application when the window state acquired through the system interface is the split-screen state; where the specified input-method application is an input-method application which is preset to execute the input operation, and the specified flag indicates that the window state of the current window is the split-screen state; and starting up the floating keyboard through the specified input-method application based on the specified flag and displaying the floating keyboard.

In some embodiments, starting up the floating keyboard through the specified input-method application based on the specified flag and displaying the floating keyboard includes: if the specified flag further indicates a display position of the current window, starting up the floating keyboard through the specified input-method application, and displaying the floating keyboard in a position corresponding to the display position of the current window.

In some embodiments, the floating keyboard further includes a keyboard mode switching key, and the method further includes: switching the floating keyboard into a common keyboard that takes up a bottom area of the screen when a switching command triggered by the keyboard mode switching key is received based on the floating keyboard.

In some embodiments, after displaying the floating keyboard when the window state is the split-screen state, the method further includes: monitoring whether or not to exit the split-screen state; and switching the floating keyboard into a common keyboard that takes up a bottom area of the screen if exiting the split-screen state is monitored.

In some embodiments, after displaying the floating keyboard, the method further includes: adjusting a display position of the floating keyboard based on a position adjustment command when the position adjustment command is received based on the floating keyboard; and/or adjusting a display size of the floating keyboard based on a size adjustment command when the size adjustment command is received based on the floating keyboard.

In some embodiments, the method further includes: displaying a common keyboard when the window state is not the split-screen state, where the common keyboard takes up a bottom area of the screen and comprises a keyboard mode switching key; and switching the common keyboard into the floating keyboard when a switching command triggered by the keyboard mode switching key is received based on the common keyboard.

Figure 2A:
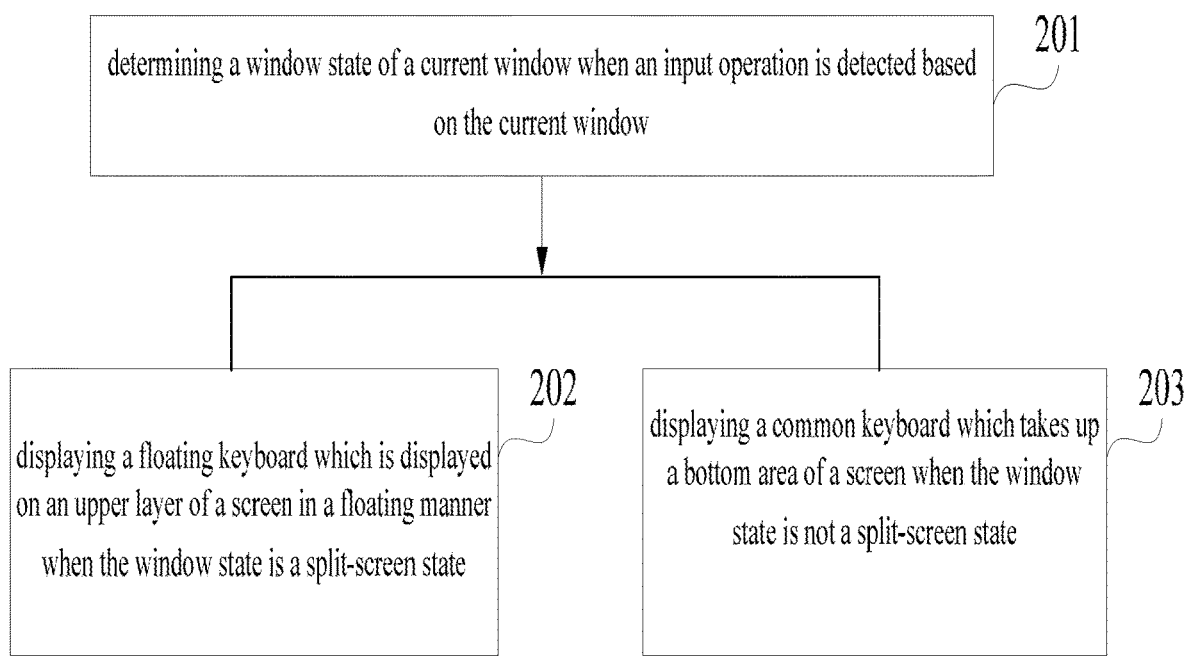
FIG. 2A is a flowchart illustrating another keyboard display method according to some embodiments.

FIG. 2A is a flowchart of another keyboard display method according to some embodiments, and the method is applied to a terminal. As shown in FIG. 2A, the method includes the following steps.

In step 201, a window state of a current window is determined when an input operation is detected based on the current window.

The input operation is used for indicating that inputting should be performed in the current window and is also used for triggering and calling an input keyboard, so that a user can perform inputting with the input keyboard. In practice, the input operation may be a click operation, etc. on the input box of the current window. The input keyboard is a virtual keyboard displayed on the screen and may be a keyboard in the form of Sudoku or a full keyboard.

The current window is a window currently displayed by the terminal, and the window states of the current window comprise a split-screen state and a non-split-screen state. The split-screen state indicates that the current window is a split-screen window displayed in the split-screen display mode, and the non-split-screen state is a state other than a split-screen state and indicates that the current window is a normal window displayed in the non-split-screen display mode.

In some embodiments of the present disclosure, in order to guarantee the normal input of the user, the input keyboards that may be called by the input operation include a floating keyboard and a common keyboard, and different input keyboards may be called in accordance with the different window states. Therefore, before the input keyboard is called, the window state of the current window may be determined first.

During practical implementations, the window state of the current window may be acquired through a system interface. The system can be an operation system of the terminal, and the system interface can be an interface that may output the window state of the current window or the window state information of the current window in the system. The window state information indicates the window state of the current window. Furthermore, the system interface can be a native interface of the system.

During operations of the terminal, the system interface may be called by the system. After that, the window state of the current window is acquired through the called system interface. Alternatively, the window state information of the current window is acquired through the called system interface, and the window state of the current window is determined based on the window state information.

In some implementations, the window state information of the current window may comprise the display position information and the display size information of the current window, and correspondingly, said determining the window state of the current window based on the window state information may include: determining the display position and the display size of the current window based on the display position information and the display size information of the current window, and then determining whether the current window is a split-screen window or not based on the display position and the display size of the current window.

It's determined that the window state of the current window is the split-screen state when the current window is the split-screen window, and the window state of the current window is not the split-screen state when the current window is not the split-screen window. For example, the current window may be determined as the split-screen window when the display position of the current window is at the upper part of the screen and the display size is half of that of the screen.

In step 202, the floating keyboard is displayed when the window state is the split-screen state. The floating keyboard can be the keyboard displayed on the upper layer of the screen in a floating manner.

Displaying on the upper layer of the screen in a floating manner can be that the floating keyboard may cover all windows displayed on the screen and may be displayed in any position of the screen in a floating manner but not fixedly displayed in the bottom area of the screen as a common keyboard.

The floating keyboard is a virtual keyboard that can be in the form of Sudoku or a full keyboard, or any other forms of keyboards. Furthermore, in order to reduce the covering area on the split-screen window, the size of the floating keyboard may be smaller than that of the common keyboard.

In some embodiments of the present disclosure, the floating keyboard may be displayed when the window state is the split-screen state, e.g., when the current window is the split-screen window. As the floating keyboard may be displayed on the upper layer of the screen in a floating manner or may also be displayed in any position of the screen in a floating manner, the input box of the current window is prevented from being covered, and accordingly, the normal input of the user is guaranteed.

Figure 2B:
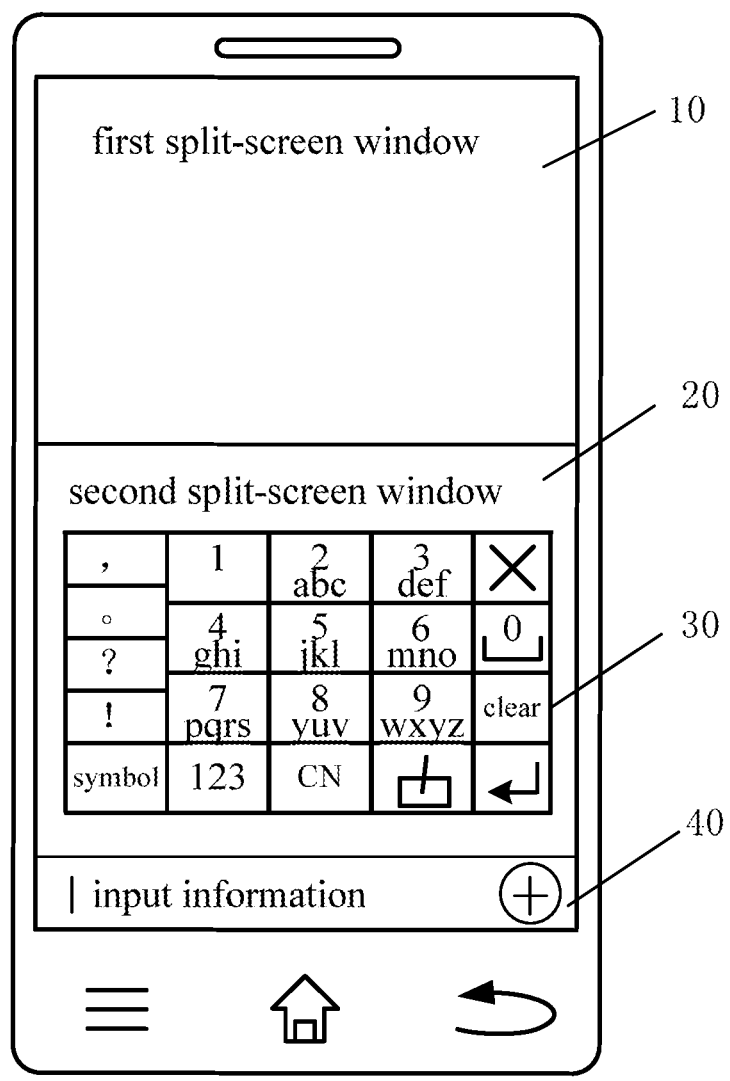
FIG. 2B is a diagram of a display interface of a terminal according to some embodiments.

For example, as illustrated in FIG. 2B, assuming that the split-screen display mode of the terminal is started in a vertical-screen display mode and an upper and a lower split-screen windows are displayed in the screen, namely, a first upper split-screen window 10 and a lower second split-screen window 20, then a floating keyboard 30 in the form of Sudoku as shown in FIG. 2B may be displayed in the second split-screen window when an input operation is detected based on an input box 40 of the second split-screen window 20.

Figure 2C:
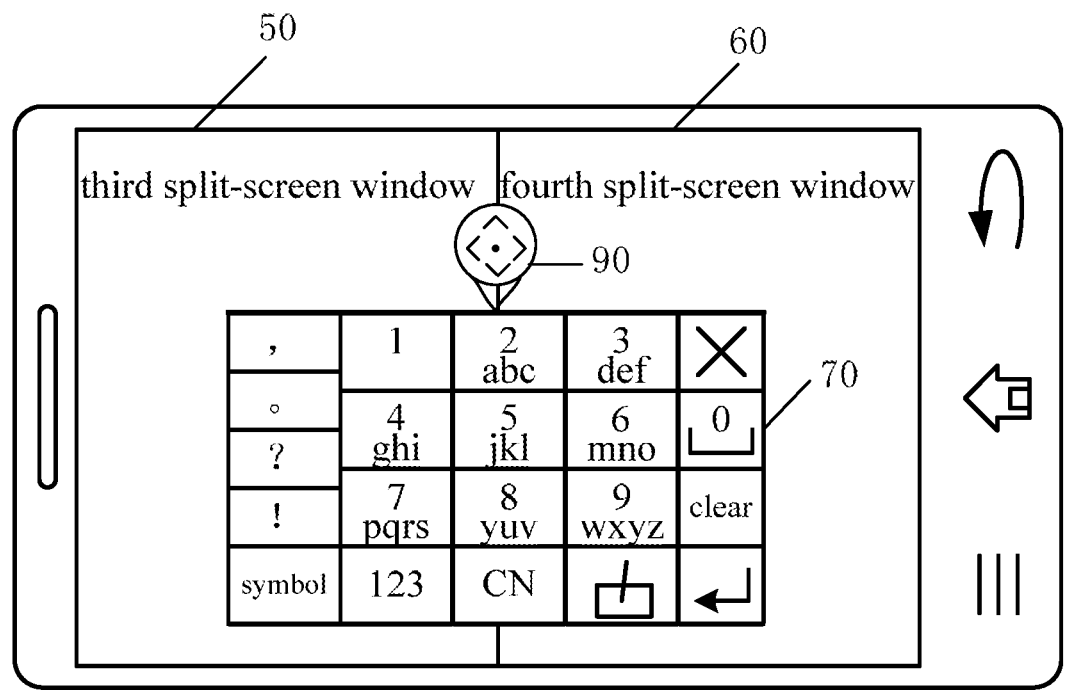
FIG. 2C is a diagram of a display interface of a terminal according to some embodiments.
Figure 2D:
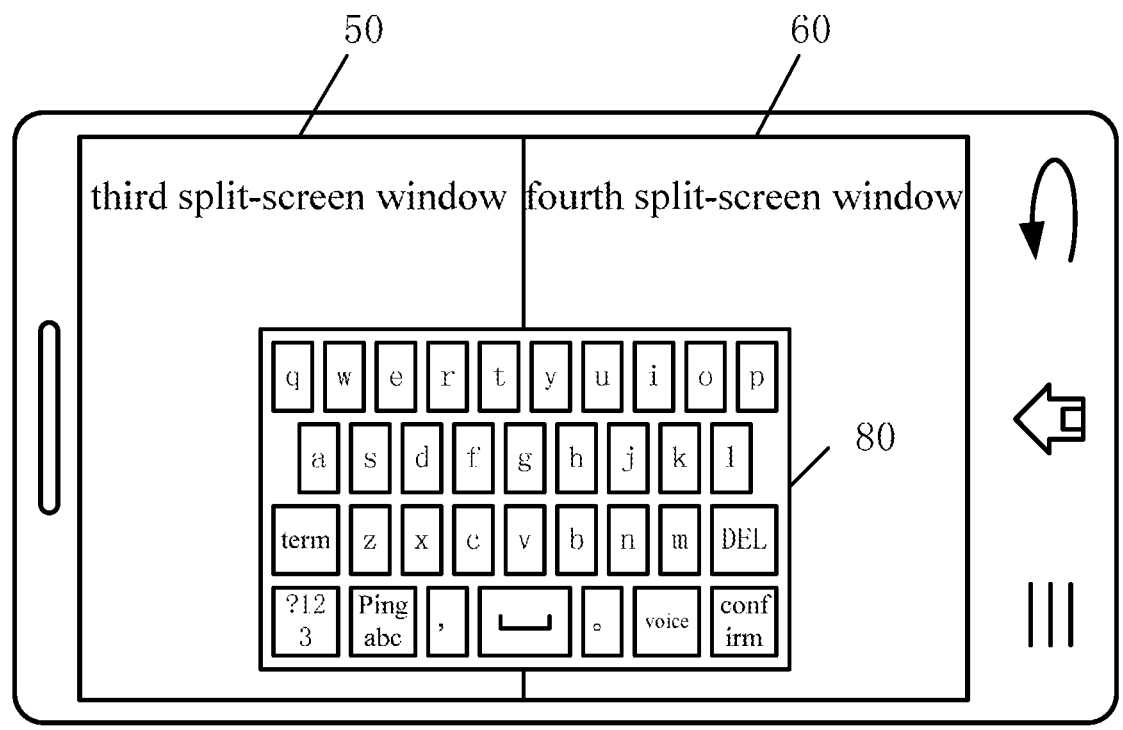
FIG. 2D is a diagram of a display interface of a terminal according to some embodiments.

Alternatively, referring to FIG. 2C and FIG. 2D, assuming that the split-screen display mode of the terminal is started in a horizontal-screen mode and an upper and a lower split-screen windows are displayed in the screen, namely a third split-screen window 50 on the left side and a fourth split-screen window 60 on the right side, then a floating keyboard 70 in the form of Sudoku as shown in FIG. 2C, or a floating keyboard 80 in the form of a full keyboard as shown in FIG. 2D may be displayed on the screen when an input operation is detected based on the third split-screen window 50 or the fourth split-screen window 60.

In practice, as the input keyboard displayed by the terminal is generally a keyboard of an input-method application installed in the terminal, the operation for displaying the input keyboard is generally implemented by the input-method application installed in the terminal, e.g., the input keyboard is called by the input-method application.

However, the input-method application is not an activity, and therefore cannot directly call a native standard interface of the terminal to acquire the split-screen state of the current window. Additionally, the input-method application is generally not a system signature application, and therefore cannot acquire the split-screen state of the current window in a reflecting mode.

In some embodiments of the present disclosure, in order to guarantee that the input-method application can acquire the split-screen state of the current window such that different input keyboards can be called in accordance with the different split-screen states subsequently, the split-screen states of the current window may be acquired through the system interface and then sent to the input-method application through the system.

In some practical implementations, said determining the window state of the current window includes: acquiring the window state of the current window through a system interface; correspondingly, said displaying the floating keyboard when the window state is the split-screen state includes: when the window state acquired through the system interface is the split-screen state, calling a specified input-method application through the system, and sending a specified flag to the specified input-method application; and starting up the floating keyboard through the specified input-method application based on the specified flag, and displaying the floating keyboard.

The specified input-method application is an input-method application that is preset to execute the input operation, namely, a default input-method application of the terminal.

The specified flag indicates that the window state of the current window is the split-screen state, and further indicates that the specified input-method application calls the floating keyboard, for example, the specified flag may be 0 or 1. In some embodiments, 0 indicates that the window state of the current window is not the split-screen state, and 1 indicates that the window state of the current window is the split-screen state.

When it is determined that the window state acquired through the system interface is the split-screen state, the system may call the interface between the system and the specified input-method application and then send the specified flag to the specified input-method application through the interface. When the specified input-method application detects that the interface between the specified input-method application and the system is called and when the specified flag is received, the floating keyboard may be called.

Further, the display position of the floating keyboard may be set at the outer side of the input box of the current window, that is, the floating keyboard is displayed at the outer side of the input box of the current window. For example, the floating keyboard is displayed above or below the input box of the current window.

Further, when the specified flag further indicates the display position of the current window, starting up the floating keyboard through the specified input-method application based on the specified flag and displaying the floating keyboard may further include: starting the floating keyboard through the specified input-method application, and displaying the floating keyboard in the position corresponding to the display position of the current window.

That is, the specified flag may have a certain expansibility and may indicate not only the split-screen state of the current window but also the display position of the current window.

In some practical implementations, the specified input-method application may save the corresponding relationship between the display position of the current window and the display position of the floating keyboard in advance, and then the display position of the current window is determined based on the specified flag. The display position of a floating window to be displayed is determined based on the display position of the current window and the corresponding relationship, and the floating window is displayed in the determined display position.

The corresponding relationship between the display position of the current window and the display position of the floating keyboard may be set by the terminal by default, or set by a user, or set according to other implementations know to those of ordinary skill in the art.

For example, in a case that the display position of the current window is at the upper part of the screen, the corresponding display position of the floating keyboard may be at the lower part of the screen. In a case that the display position of the current window is at the lower part of the screen, the corresponding display position of the floating keyboard may be at the upper part of the screen.

In some embodiments, if the terminal is in the current up-and-down split-screen mode, when it is detected that the input-method application is called, because the input-method keyboard is usually displayed in a landscape mode (namely, the input-method keyboard is usually displayed with its width normally greater than its height), the terminal may be automatically switched into in a left-and-right split-screen mode for display, and the floating keyboard of the input-method application may be displayed relatively between the left and right split screens in a floating manner, which is more convenient for the user's operation and further improves the user experience.

After the display of the floating keyboard, the method can further include the following steps: adjusting the display position of the floating keyboard according to a position adjustment command when the position adjustment command is received based on the floating keyboard; and/or, adjusting the display size of the floating keyboard according to a size adjustment command when the size adjustment command is received based on the floating keyboard. That is, the position and/or the size of the floating keyboard can be adjustable.

Both the position adjustment command and the size adjustment command may be triggered by the user through a specified operation, and the specified operation may be a click operation, a slide operation, a voice operation, a gesture operation, a shake operation, etc., which is not limited in the embodiments of the present disclosure. For example, the operation triggering the position adjustment command may be an operation of dragging the floating keyboard, and the operation triggering the size adjustment command may be an operation of clicking the border of the floating keyboard and dragging thereof, etc.

In some implementations, when the dragging operation on the specified position of the floating keyboard is detected, it is determined that the position adjustment command is received, and the display position of the floating keyboard may be adjusted in accordance with the dragging direction of the dragging operation. The specified position may be any position on the floating keyboard, e.g., a blank space position, a center position, or a top position of the floating keyboard, etc., which is not limited in the embodiments of the present disclosure.

As such, the user can conveniently adjust the display position of the floating keyboard by dragging the floating keyboard, improving user's operation convenience and adjustment efficiency.

In some other implementations, when the display command is received based on the floating keyboard, a position adjustment icon may be displayed in the position corresponding to the floating keyboard, and when an operation triggering the position adjustment icon is detected, it is determined that the position adjustment command is received.

The display command can include instructions of displaying the position adjustment icon, and the display command may be triggered by a specific operation of the user.

For example, the specified operation may be a click operation, a double-click operation, a long-press operation, etc., on the specified position of the floating keyboard. The corresponding position of the floating keyboard may be a specified position on the floating keyboard or a position around the floating keyboard. The position adjustment icon is used for adjusting the display position of the floating keyboard.

Further, the position adjustment icon may include multiple direction adjustment flags, and different direction adjustment flags indicate different adjustment directions. When a triggering operation on any direction adjustment flag is detected, the position of the floating keyboard may be adjusted in accordance with the direction indicated by the direction adjustment flag.

For example, referring to FIG. 2C, when the display command is received based on the floating keyboard, a position adjustment icon 90 may be displayed above the floating keyboard. The position adjustment icon 90 includes four direction adjustment flags in the formats of arrows that indicate the up, down, left and right four adjustment directions. If the terminal detects the triggering operation of the user on any one of the direction adjustment flags on the position adjustment icon 90, the floating keyboard may be moved in the corresponding direction to adjust its display position.

In some implementations, if the dragging operation on the border of the floating keyboard is detected, it is determined that the size adjustment command is received. For example, the user may click any corner of the floating keyboard and then drag inwards or outwards to zoom in or zoom out the floating keyboard. Of course, the size of the floating keyboard may also be adjusted with other methods, which are not limited in the embodiments of the present disclosure.

Further, the floating keyboard may also include a keyboard mode switching key, and when a switching command triggered by the keyboard mode switching key is received on the basis of the floating keyboard, the floating keyboard may be switched into a common keyboard that takes up a bottom area of the screen.

If a user does not want to use the floating keyboard, the user may switch the floating keyboard into the common keyboard through the switching command, which further enriches the keyboard display modes and improves the keyboard display flexibility and the user experience.

The switching command may be triggered by a specified operation of the user on the keyboard mode switching key, and the specified operation may be a click operation, a double-click operation, a long-press operation, a slide operation, etc., on the keyboard mode switching key, which is not limited in the embodiments of the present disclosure.

The keyboard mode switching key is configured to switch the keyboard modes that include the floating keyboard and the common keyboard. The keyboard mode switching key may be arranged in any position on the floating keyboard, and the display style of the keyboard mode switching key may be either set by a specified input method by default or set by the user, which is not limited in the embodiments of the present disclosure. For example, the keyboard mode switching key may be displayed through an icon, a control, a button, etc.

Further, after the display of the floating keyboard, the terminal may also monitor whether to exit the split-screen state or not, and if the terminal monitors that the split-screen state is exited, the floating keyboard is switched into the common keyboard. The terminal may acquire the window state of the current window through a system interface and monitors whether the current window exits the split-screen state or not in accordance with the window state of the current window, that is, whether the terminal exits the split-screen display mode or not.

In step 203, when the window state is not the split-screen state, the common keyboard is displayed. The common keyboard can be the keyboard taking up the bottom area of the screen, for example.

Further, the common keyboard may further include a keyboard mode switching key. If a switching command triggered by the keyboard mode switching key is received based on the common keyboard, the common keyboard may be switched into the floating keyboard. By switching the common keyboard into the floating keyboard, the user can use the floating keyboard in the split-screen display mode, which further enriches the keyboard display modes and improves the keyboard display flexibility and the user experience.

Figure 2E:
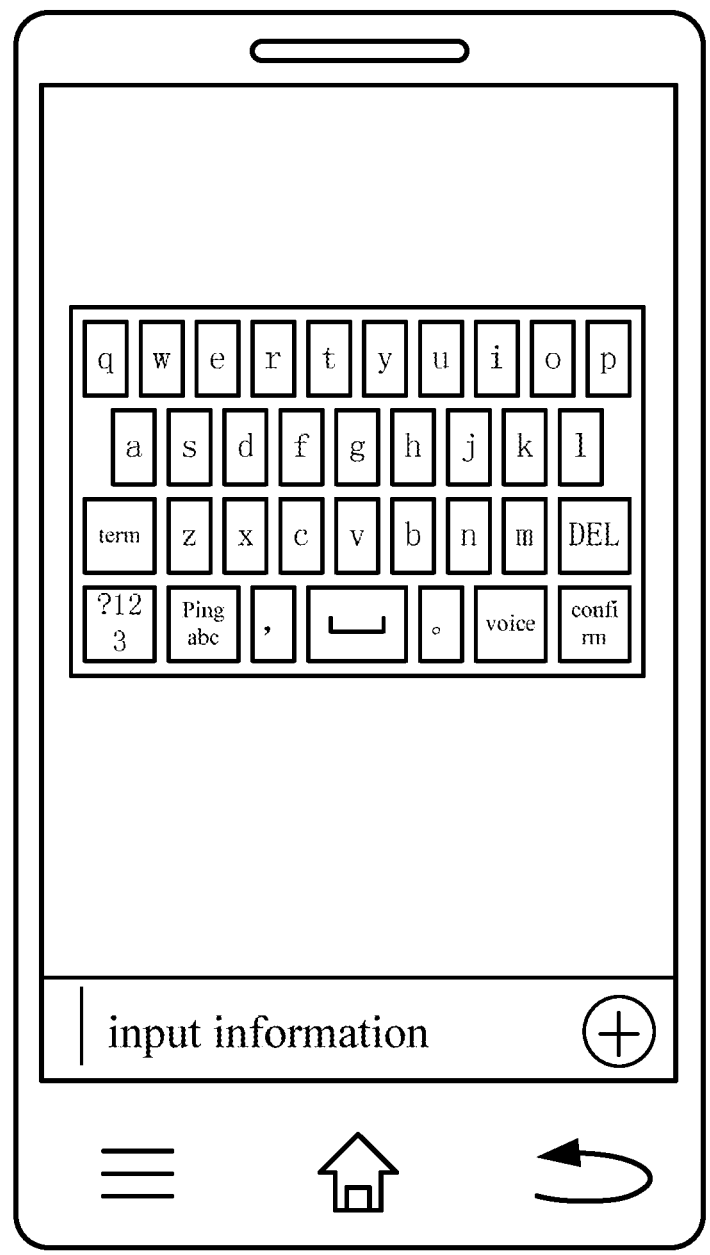
FIG. 2E is a diagram of a display interface of a terminal according to some embodiments.

For example, referring to FIG. 2E, the terminal is in the non-split-screen display mode. After the common keyboard at the bottom of the screen is switched into the floating keyboard, the terminal may display the floating keyboard as shown in FIG. 2E on the screen.

The switching command may be triggered by a specified operation of the user on the keyboard mode switching key, and the specific operation may be a click operation, a double-click operation, a long-press operation, a slide operation, etc. on the keyboard mode switching key, which are not limited in the embodiments of the present disclosure.

The keyboard mode switching key is configured to switch the keyboard modes and may be arranged in any position of the common keyboard. The display style of the keyboard mode switching key may be either set by the specified input method by default or set by the user, which are not limited in the embodiments of the present disclosure. For example, the display style of the keyboard mode switching key may be an icon, a control, a button, etc.

In addition, the display styles of the keyboard mode switching key of the floating keyboard and the keyboard mode switching key of the common keyboard may be either the same or different, which is not limited in the embodiments of the present disclosure.

In some embodiments of the present disclosure, if an input operation is detected based on the current window, the window state of the current window may be determined first. If the window state of the current window is the split-screen state, the floating keyboard is displayed. As the floating keyboard may be displayed on the upper layer of the screen in a floating manner, the input box of the split-screen window can be prevented from being covered. Therefore, the keyboard display flexibility is improved, and the normal input of the user is guaranteed.

Figure 3A:
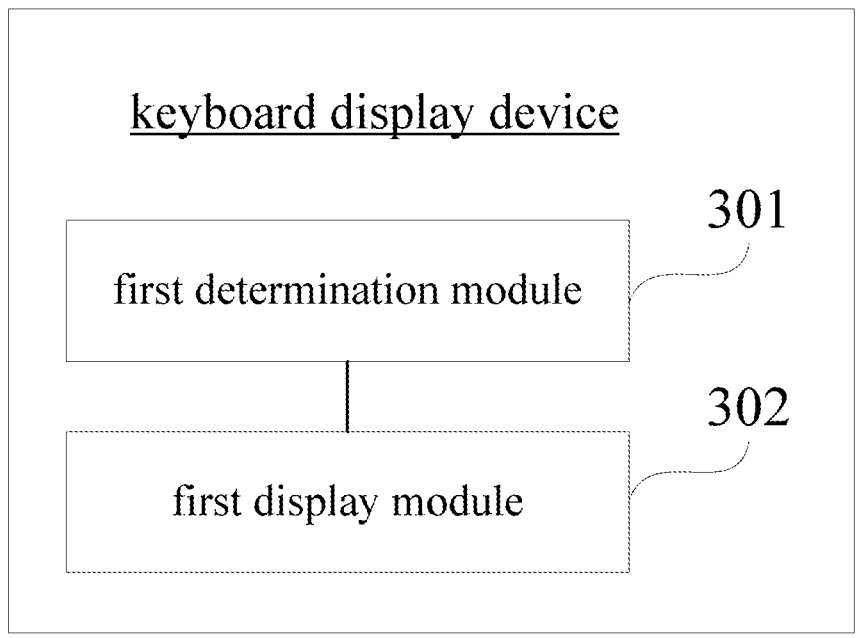
FIG. 3A is a structural diagram of a keyboard display device according to some embodiments.

FIG. 3A is a structural diagram of a keyboard display device according to some embodiments. As illustrated, the device includes: a first determination portion 301 configured to determine a window state of a current window if an input operation is detected based on the current window; and a first display portion 302 configured to display a floating keyboard displayed on an upper layer of a screen in a floating manner if the window state is a split-screen state.

In some embodiments, the various portions may in in modular form, and may be referred to as modules. In some embodiments, the various portions can be discrete components, integrally formed, hardware implemented, software implemented, or a mix thereof.

In some embodiments, the first determination portion 301 is configured to: acquire the window state of the current window through a system interface; and correspondingly, the first display portion 302 is configured to: call via a system a specified input-method application and send a specified flag to the specified input-method application if the window state acquired through the system interface is the split-screen state; wherein the specified input-method application is an input-method application that is preset to execute the input operation, and the specified flag indicates that the window state of the current window is the split-screen state; and start up the floating keyboard through the specified input-method application based on the specified flag and display the floating keyboard.

In some embodiments, the first display portion 302 is configured to: if the specified flag further indicates a display position of the current window, start up the floating keyboard through the specified input-method application, and display the floating keyboard in a position corresponding to the display position of the current window.

Figure 3B:
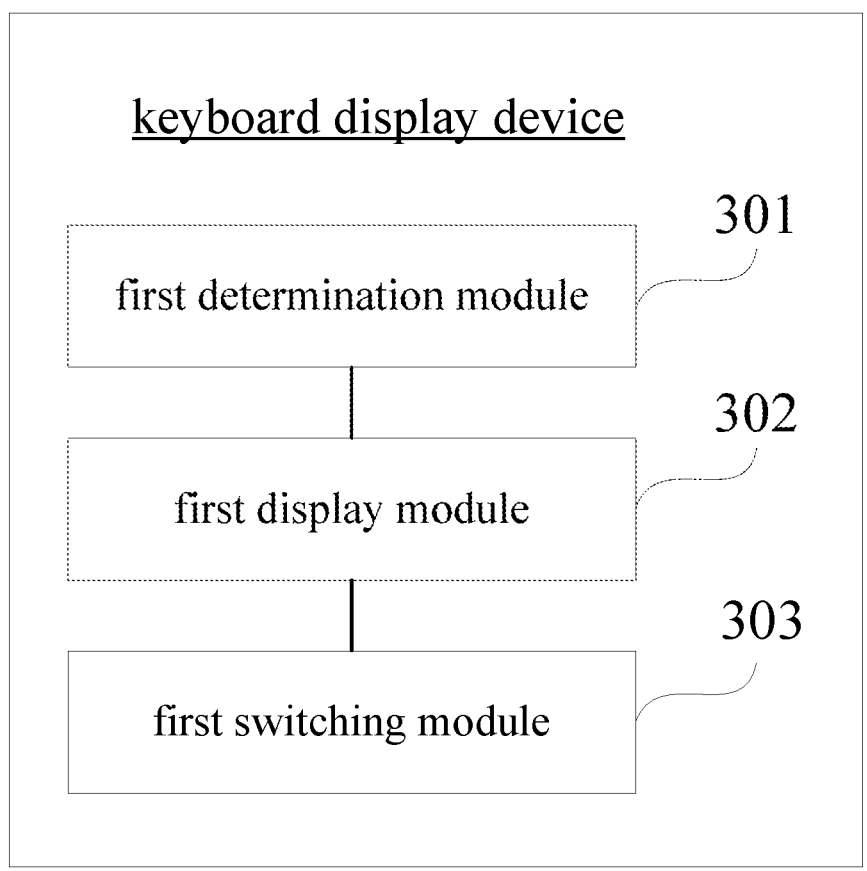
FIG. 3B is a structural diagram of a keyboard display device according to some embodiments.

In some embodiments, referring to FIG. 3B, the floating keyboard further comprises a keyboard mode switching key and the device further includes: a first switching portion 303 configured to switch the floating keyboard into a common keyboard that takes up a bottom area of the screen when a switching command triggered by the keyboard mode switching key is received based on the floating keyboard.

Figure 3C:
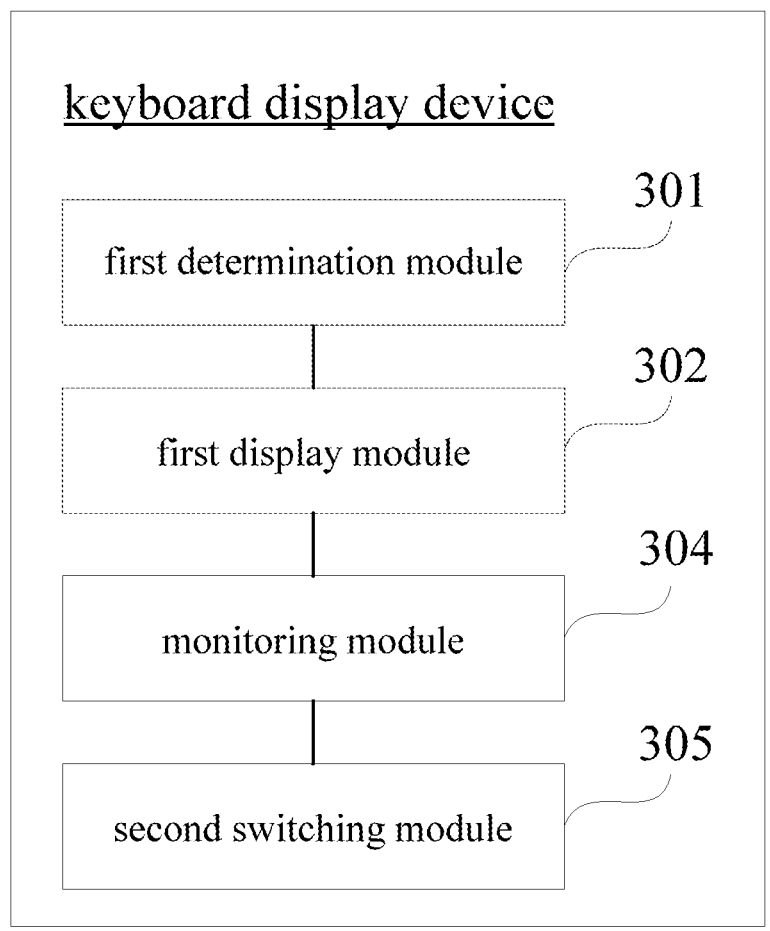
FIG. 3C is a structural diagram of a keyboard display device according to some embodiments.

In some embodiments, as illustrated in FIG. 3C, the device further includes: a monitoring portion 304 configured to monitor whether or not to exit the split-screen state; and a second switching portion 305 configured to switch the floating keyboard into a common keyboard that takes up a bottom area of the screen if exiting the split-screen state is monitored.

Figure 3D:
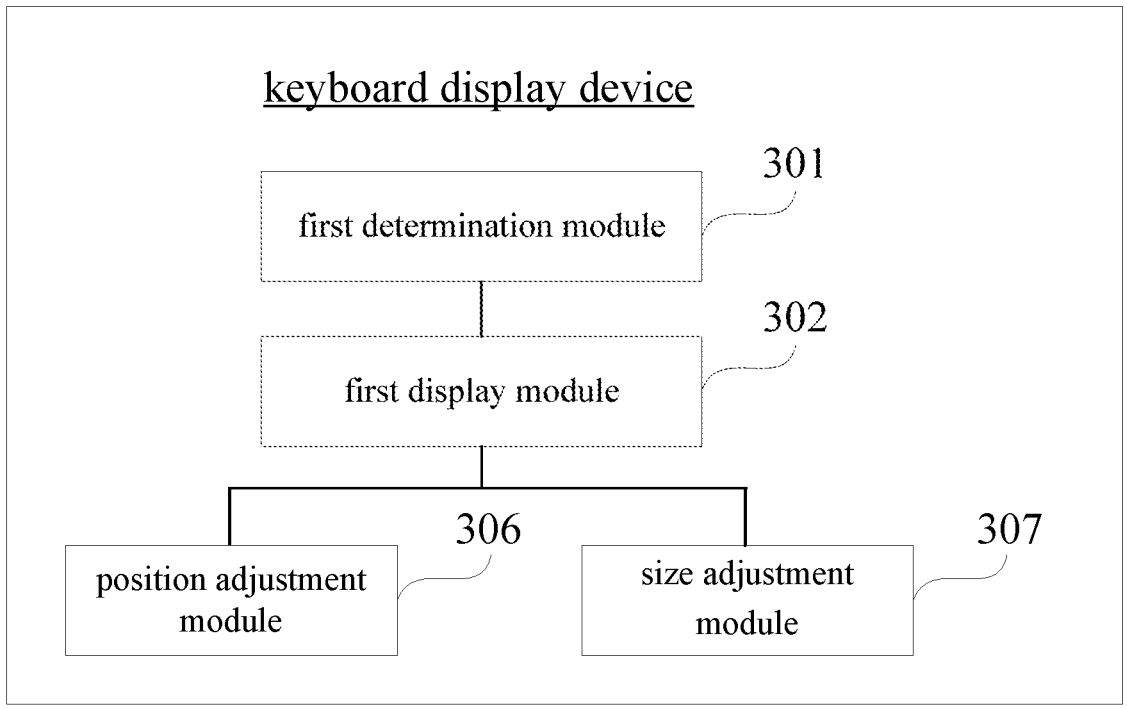
FIG. 3D is a structural diagram of a keyboard display device according to some embodiments.

In some embodiments, as illustrated in FIG. 3D, the device further includes: a position adjustment portion 306 configured to adjust a display position of the floating keyboard based on a position adjustment command if the position adjustment command is received based on the floating keyboard; and/or a size adjustment portion 307 configured to adjust a display size of the floating keyboard based on a size adjustment command if the size adjustment command is received based on the floating keyboard.

Figure 3E:
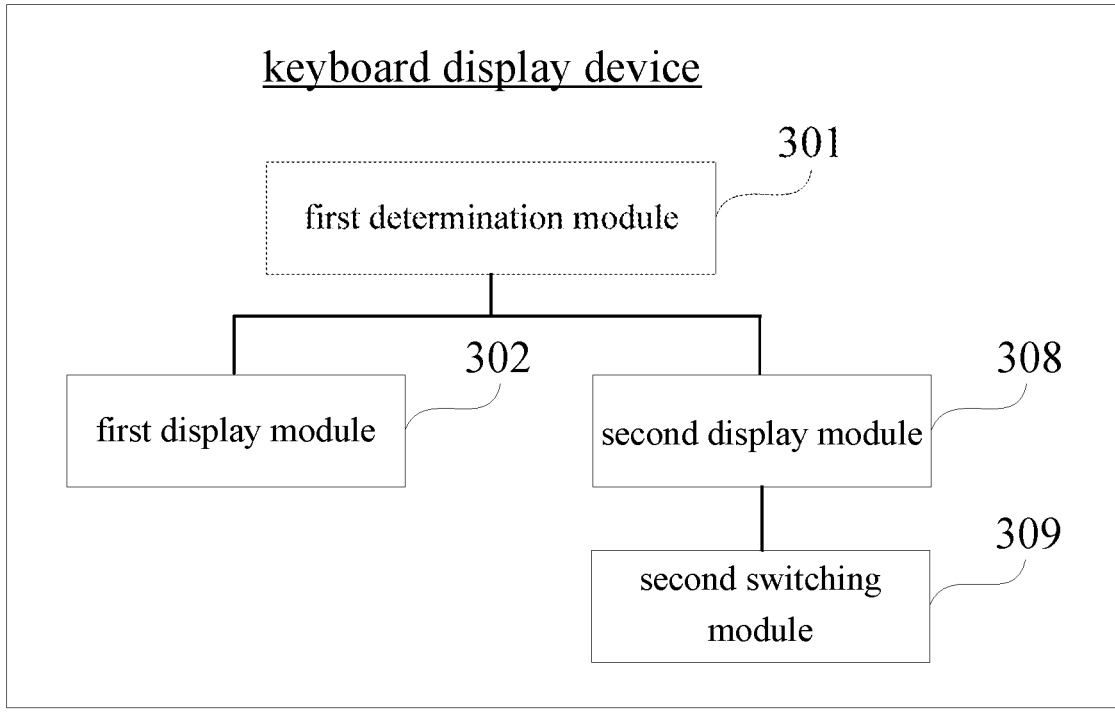
FIG. 3E is a structural diagram of a keyboard display device according to some embodiments.

In some embodiments, referring to FIG. 3E, the device further includes: a second display portion 308 configured to display a common keyboard when the window state is not the split-screen state, where the common keyboard takes up a bottom area of the screen and includes a keyboard mode switching key; and a third switching portion 309 configured to switch the common keyboard into the floating keyboard if a switching command triggered by the keyboard mode switching key is received based on the common keyboard.

In some embodiments of the present disclosure, if an input operation is detected based on the current window, the window state of the current window may be determined first. If the window state of the current window is the split-screen state, the floating keyboard is displayed. As the floating keyboard may be displayed on the upper layer of the screen in a floating manner, the input box of the split-screen window can be prevented from being covered. As such, the keyboard display flexibility is improved, and the normal input of the user is guaranteed.

With respect to the device of some of the embodiments, the specific method of operation performed by each portion or module has been described in details in the embodiments of the methods, and the description thereof may not be described in detail herein.

Figure 4:
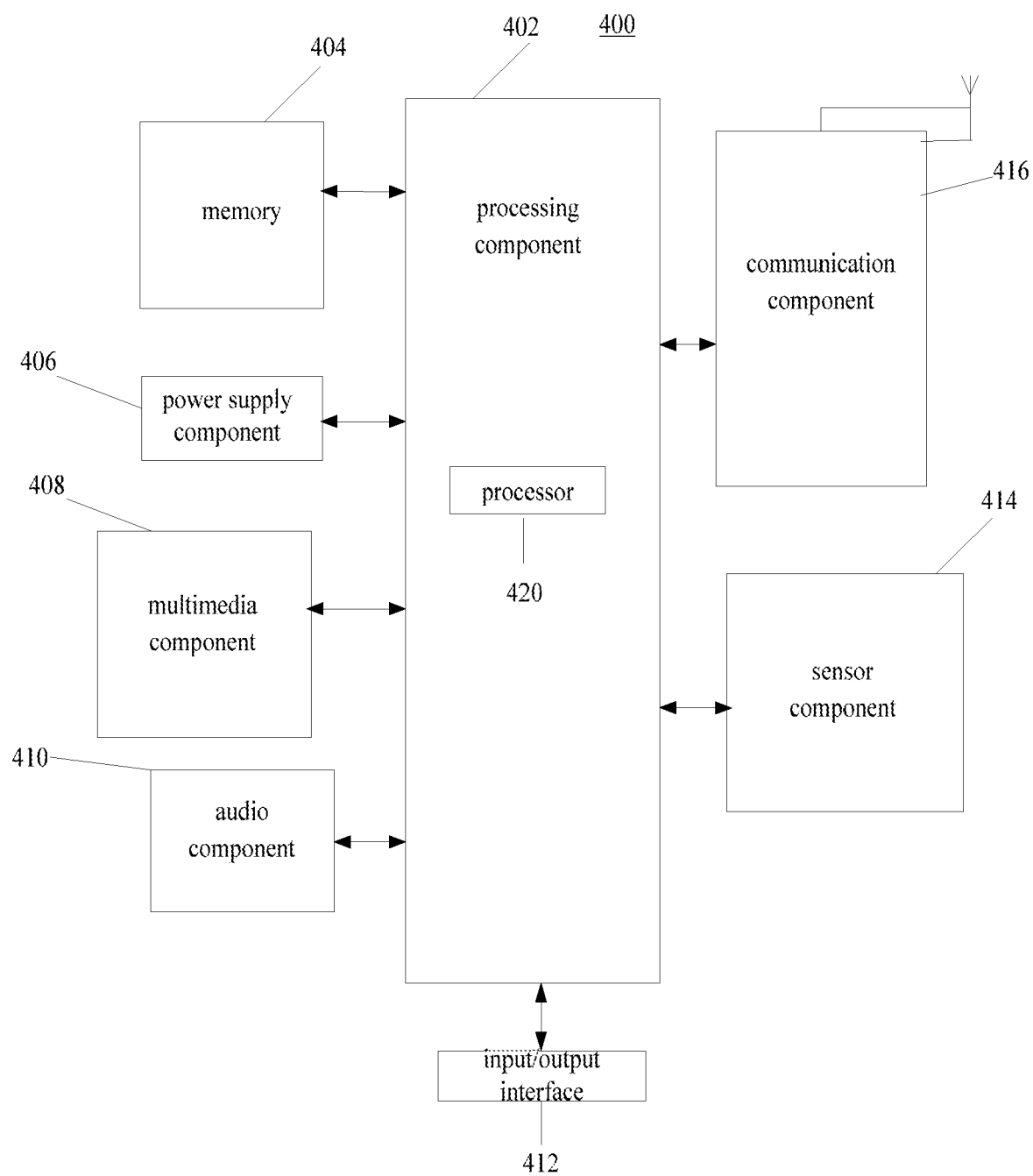
FIG. 4 is a structural diagram of a terminal according to some embodiments.

FIG. 4 is a structural diagram of a terminal 400 according to some embodiments. For example, the terminal 400 may be a mobile phone, a computer, a digital broadcast terminal, a messaging device, a game console, a tablet device, a medical device, a fitness device, a personal digital assistant, etc.

Referring to FIG. 4, the terminal 400 may include one or more of the following components: a processing component 402, a memory 404, a power supply component 406, a multimedia component 408, an audio component 410, an input/output (I/O) interface 42, a sensor component 414, and a communication component 416.

The processing component or processing circuit 402 generally may control the overall operation of the terminal 400, such as operations associated with display, phone call, data communication, camera operation, and recording operation. The processing component 402 may include one or more processors 420 to execute instructions, to complete all or part of the steps described above. In addition, the processing component 402 may include one or more portions or modules to facilitate the interactions between the processing component 402 and other components. For example, the processing component 402 may include a multimedia portion or module to facilitate interaction between the multimedia component 408 and the processing component 402.

The memory 404 may be configured to store various types of data to support the operation of the terminal 400. Examples of such data can include instructions of any application or method operating on the terminal 400, contact data, phonebook data, messages, pictures, videos, and the like. The memory 404 may be implemented by any type of volatile or nonvolatile memory device or a combination thereof, such as static random-access memory (SRAM), electrically erasable programmable read only memory (EE-PROM), erasable programmable read only memory (EPROM), programmable read only memory (PROM), read only memory (ROM), magnetic memory, flash memory, disk or CD.

The power supply 406 may provide power to the various components of the terminal 400. The power supply 406 may include a power management system, one or more power supplies, and other components associated with generating, managing, and distributing power for the terminal 400.

The multimedia component 408 may include a screen providing an output interface between the terminal 400 and the user. In some embodiments, the screen may include a liquid crystal display (LCD) and a touch panel (TP). If the screen includes a touch panel, the screen may be implemented as a touch screen to receive input signals from the user.

The touch panel can include one or more touch sensors to sense touches, slides, and gestures over touch panels. The touch sensors may sense not only the boundary of the touch or slide actions, but also the duration and pressure associated with the touch or slide operation.

In some embodiments, the multimedia component 408 may include a front camera and/or a rear camera. If the terminal 400 is at an operating mode, such as a shooting mode or a video mode, the front camera and/or the rear camera may receive external multimedia data. Each front camera and rear camera can be a fixed optical lens system or have focal length and optical zoom capability.

In some embodiments, other types of displays, such as a light-emitting diode (LED) display, an organic LED (OLED) display, a micro LED (μLED) display, a quantum-dot LED (QLED) display, etc. The displays can be touch screens as well.

In some implementations, the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), plasma, other flexible configuration, or any other monitor for displaying information to the user and a keyboard, a pointing device, e.g., a mouse, trackball, etc., or a touch screen, touch pad, etc., by which the user can provide input to the computer.

The audio component 410 may be configured to output and/or input an audio signal. For example, the audio component 410 may include a microphone (MIC) that is configured to receive external audio signals when the terminal 400 is in the operating mode, such as a call mode, a recording mode, and a voice recognition mode. The received audio signals may be further stored in the memory 404 or transmitted via the communication component 416. In some embodiments, the audio component 410 can also include a speaker for outputting the audio signals.

The I/O interface 412 can provide the interface between the processing component 402 and a peripheral interface. The peripheral interface may be a keyboard, a mouse, buttons, or the like, and may be referred to as a peripheral interface portion or a peripheral interface module. The buttons may include, but are not limited to, a home button, a volume button, a start button, and a lock button.

The sensor component 414 may include one or more sensors configured to provide condition assessments of the various aspects of the terminal 400. For example, the sensor component 414 may detect the on/off state of the terminal 400, the relative positioning of the components, such components can be the display and keypad of the terminal 400, and the sensor component 414 may also detect position changes of the terminal 400 or any component thereof, presence or absence of the user contact with the terminal 400, orientation, acceleration/deceleration, or the temperature changes of the terminal 400.

The sensor component 414 may include a proximity sensor configured to detect the presence of a nearby object without any physical contact. The sensor component 414 may also include a light sensor, such as a CMOS or CCD image sensor, for imaging applications. In some embodiments, the sensor component 414 may also include acceleration sensors, gyro sensors, magnetic sensors, pressure sensors, or temperature sensors, etc.

The communication component 416 may be configured to facilitate wired or wireless communication between the terminal 400 and other apparatuses. The terminal 400 may access a wireless network based on a communication standard, such as Wi-Fi, 2G or 3G or a combination thereof. In some embodiments, the communication component 416 can receive broadcast signals or broadcast-related information from an external broadcast management system via broadcast channels.

In some embodiments, the communication component 416 may also include a near field communication (NFC) portion to facilitate short-range communication. For example, the NFC portion may be implemented based on radio frequency identification (RFID) technology, infrared data association (IrDA) technology, ultra wideband (UWB) technology, Bluetooth (BT) technology, or other technologies.

In some embodiments, the terminal 400 may be implemented by one or more application specific integrated circuits (ASICs), digital signal processors (DSPs), digital signal processing devices (DSPDs), programmable logic devices (PLDs), field programmable gate array (FPGA), a controller, a microcontroller, a microprocessor, or other electronic components configured to perform the keyboard display method described in the embodiment of either FIG. 1 or FIG. 2A.

In some embodiments, a non-transitory computer readable storage medium is provided having instructions stored thereon, such as the memory 404 having the instructions stored thereon. The instructions may be executed by the processor 420 of the terminal 400 to complete the methods described above. For example, the non-transitory computer readable storage medium may be a ROM, a random-access memory (RAM), a CD-ROM, a magnetic tape, a floppy disk, an optical data storage device, etc.

In another aspect, a terminal is provided. The terminal includes a processor; and a memory device for storing instructions executable by the processor. The processor is configured to perform the keyboard display methods according to various embodiments, e.g., those illustrated in FIG. 1 or FIG. 2A.

In another aspect, a non-transitory computer-readable storage medium is provided having stored therein instructions. The instructions may be executed by a processor or processing circuit to perform various keyboard display methods according to various embodiments, e.g., those illustrated in FIG. 1 or FIG. 2A.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method of displaying a keyboard, comprising:
when an input operation is detected based on the current window, acquiring a window state of a current window through an operating system interface;
sending a specified flag to a specified input-method application based upon the window state acquired through the operating system interface being the split-screen state, wherein the specified input-method application is a default input-method application preset to execute the input operation, and the specified flag indicates that the window state of the current window is the split-screen state;
in a case that the specified flag further indicates a display position of the current window, starting up a floating keyboard through the specified input-method application, wherein the display position of the current window is determined based on the specified flag, the display position of a floating window to be displayed is determined based on the display position of the current window and a corresponding relationship between the display position of the current window and the display position of the floating keyboard, and the floating window is displayed in the determined display position, wherein in a case that the display position of the current window is at an upper portion of the screen, a corresponding display position of the floating keyboard is at a lower portion of the screen, and in a case that the display position of the current window is at the lower portion of the screen, the corresponding display position of the floating keyboard is at the upper portion of the screen;
when the split-screen display mode of the terminal is started in a horizontal-screen mode and an upper window and a lower split-screen window are displayed in the screen, displaying a floating keyboard in a form of a full keyboard, or a floating keyboard in a form of a simplified grid keyboard having less keys than the full keyboard on the screen upon an input operation is detected based on the upper window or the lower window;
wherein:
a position adjustment icon is displayed in the position corresponding to the floating keyboard;
the position adjustment icon is configured to adjust the display position of the floating keyboard;
the position adjustment icon includes multiple direction adjustment flags; and
different direction adjustment flags indicate different adjustment directions.

2. The method of claim 1, wherein the floating keyboard further comprises a keyboard mode switching key, and the method further comprises:
switching the floating keyboard into a common keyboard that takes up a bottom area of the screen when a switching command triggered by the keyboard mode switching key is received based on the floating keyboard.

3. The method of claim 1, further comprising, after the displaying the floating keyboard based upon the window state being the split-screen state:
monitoring whether or not to exit the split-screen state; and
switching the floating keyboard into a common keyboard that takes up a bottom area of the screen if exiting the split-screen state is monitored.

4. The method of claim 1, further comprising, after the displaying the floating keyboard, at least one of:
adjusting a display position of the floating keyboard based on a position adjustment command when the position adjustment command is received based on the floating keyboard; or
adjusting a display size of the floating keyboard based on a size adjustment command when the size adjustment command is received based on the floating keyboard.

5. The method of claim 1, further comprising:
displaying a common keyboard in a case that the window state is not the split-screen state, wherein the common keyboard takes up a bottom area of the screen and comprises a keyboard mode switching key; and
switching the common keyboard into the floating keyboard when a switching command triggered by the keyboard mode switching key is received based on the common keyboard.

6. A terminal, comprising:
a processor; and
memory configured to store instructions executable by the processor;
wherein the processor is configured to
when an input operation is detected based on the current window, acquire a window state of a current window through an operating system interface;
send a specified flag to a specified input-method application based upon the window state acquired through the operating system interface being the split-screen state, wherein the specified input-method application is a default input-method application preset to execute the input operation, and the specified flag indicates that the window state of the current window is the split-screen state;
in a case that the specified flag further indicates a display position of the current window, start up the floating keyboard through the specified input-method application, and the display position of the current window is determined based on the specified flag, the display position of a floating window to be displayed is determined based on the display position of the current window and a corresponding relationship between the display position of the current window and the display position of the floating keyboard, and the floating window is displayed in the determined display position, wherein in a case that the display position of the current window is at an upper portion of the screen, a corresponding display position of the floating keyboard is at a lower portion of the screen, and in a case that the display position of the current window is at the lower portion of the screen, the corresponding display position of the floating keyboard is at the upper portion of the screen;

when the split-screen display mode of the terminal is started in a horizontal-screen mode and an upper window and a lower split-screen window are displayed in the screen, displaying a floating keyboard in a form of a full keyboard, or a floating keyboard in a form of a simplified grid keyboard having less keys than the full keyboard on the screen upon an input operation is detected based on the upper window or the lower window;

wherein a position adjustment icon is displayed in the position corresponding to the floating keyboard, the position adjustment icon is configured to adjust the display position of the floating keyboard, the position adjustment icon includes multiple direction adjustment flags, and different direction adjustment flags indicate different adjustment directions.

7. The terminal of claim 6, wherein the floating keyboard further comprises a keyboard mode switching key, the processor is further configured to:
switch the floating keyboard into a common keyboard that takes up a bottom area of the screen when a switching command triggered by the keyboard mode switching key is received based on the floating keyboard.

8. The terminal of claim 6, wherein the processor is further configured to:
monitor whether or not to exit the split-screen state; and
switch the floating keyboard into a common keyboard that takes up a bottom area of the screen if exiting the split-screen state is monitored.

9. The terminal of claim 6, wherein the processor is further configured to:
adjust a display position of the floating keyboard based on a position adjustment command when the position adjustment command is received based on the floating keyboard; and/or
adjust a display size of the floating keyboard based on a size adjustment command when the size adjustment command is received based on the floating keyboard.

10. The terminal of claim 6, wherein the processor is further configured to:
display a common keyboard in a case that the window state is not the split-screen state, wherein the common keyboard takes up a bottom area of the screen and comprises a keyboard mode switching key; and
switch the common keyboard into the floating keyboard when a switching command triggered by the keyboard mode switching key is received based on the common keyboard.

11. A non-transitory computer-readable storage medium having stored therein instructions executable by a processing circuit, the instructions comprising:

when an input operation is detected based on the current window, acquiring the window state of the current window through an operating system interface;

sending a specified flag to a specified input-method application based upon the window state acquired through the operating system interface being the split-screen state, wherein the specified input-method application is a default input-method application preset to execute the input operation, and the specified flag indicates that the window state of the current window is the split-screen state;

in a case that the specified flag further indicates a display position of the current window, starting up the floating keyboard through the specified input-method application, and the display position of the current window is determined based on the specified flag, the display position of a floating window to be displayed is determined based on the display position of the current window and a corresponding relationship between the display position of the current window and the display position of the floating keyboard, and the floating window is displayed in the determined display position, wherein in a case that the display position of the current window is at an upper portion of the screen, a corresponding display position of the floating keyboard is at a lower portion of the screen, and in a case that the display position of the current window is at the lower portion of the screen, the corresponding display position of the floating keyboard is at the upper portion of the screen;

when the split-screen display mode of the terminal is started in a horizontal-screen mode and an upper window and a lower split-screen window are displayed in the screen, displaying a floating keyboard in a form of a full keyboard, or a floating keyboard in a form of a simplified grid keyboard having less keys than the full keyboard on the screen upon an input operation is detected based on the upper window or the lower window;

wherein a position adjustment icon is displayed in the position corresponding to the floating keyboard, the position adjustment icon is configured to adjust the display position of the floating keyboard, the position adjustment icon includes multiple direction adjustment flags, and different direction adjustment flags indicate different adjustment directions.

12. The storage medium of claim 11, wherein the displaying a floating keyboard through the specified input-method application comprises:
sending a specified flag to the specified input-method application based upon the window state acquired through the operating system interface being the split-screen state,
wherein the specified input-method application comprises an input-method application preset to execute the input operation, and the specified flag indicates that the window state of the current window is the split-screen state; and
starting up the floating keyboard through the specified input-method application based on the specified flag and displaying the floating keyboard.

13. The storage medium of claim 12, wherein the starting up the floating keyboard through the specified input-method application based on the specified flag and displaying the floating keyboard comprises:
in a case that the specified flag further indicates a display position of the current window, starting up the floating keyboard through the specified input-method application, and displaying the floating keyboard in a position corresponding to the display position of the current window.

14. The storage medium of claim 11, wherein the floating keyboard further comprises a keyboard mode switching key, and the instructions further comprise:

switching the floating keyboard into a common keyboard that takes up a bottom area of the screen when a switching command triggered by the keyboard mode switching key is received based on the floating keyboard.

15. The storage medium of claim 11, wherein the instructions further comprise, after the displaying the floating keyboard based upon the window state being the split-screen state:

monitoring whether or not to exit the split-screen state; and switching the floating keyboard into a common keyboard that takes up a bottom area of the screen if exiting the split-screen state is monitored.

16. The storage medium of claim 11, wherein the instructions further comprise, after the displaying the floating keyboard, at least one of:

adjusting a display position of the floating keyboard based on a position adjustment command when the position adjustment command is received based on the floating keyboard; or adjusting a display size of the floating keyboard based on a size adjustment command when the size adjustment command is received based on the floating keyboard.

* * * * *